United States Patent
Andrews et al.

(10) Patent No.: US 6,790,499 B2
(45) Date of Patent: Sep. 14, 2004

(54) POLYESTER COMPOSITIONS OF LOW RESIDUAL ALDEHYDE CONTENT

(75) Inventors: Stephen M Andrews, New Fairfield, CT (US); Paul A. Odorisio, Leonia, NJ (US); Dirk Simon, Mutterstadt (DE)

(73) Assignee: Ciba Speicalty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/034,048

(22) Filed: Dec. 20, 2001

(65) Prior Publication Data

US 2002/0137856 A1 Sep. 26, 2002

Related U.S. Application Data

(60) Provisional application No. 60/259,140, filed on Dec. 29, 2000, and provisional application No. 60/287,925, filed on Apr. 30, 2001.

(51) Int. Cl.⁷ ............................. C08L 67/02; B29D 22/00
(52) U.S. Cl. ................. 428/36.92; 428/35.7; 428/36.6; 525/57; 525/58; 525/166; 525/175; 525/176; 524/35; 524/47; 524/48; 524/56; 524/386; 524/387; 524/388
(58) Field of Search ............................. 428/35.7, 36.92, 428/36.6; 524/35, 47, 48, 58, 386, 387, 388, 56; 525/175, 166, 176, 57, 58

(56) References Cited

U.S. PATENT DOCUMENTS

| | | | |
|---|---|---|---|
| 2,848,432 A | 8/1958 | Schulken, Jr. et al. | 260/45.4 |
| 4,361,681 A | 11/1982 | Bernhardt | 525/444 |
| 4,394,470 A | 7/1983 | Werner et al. | 524/56 |
| 4,837,115 A | 6/1989 | Igarashi et al. | 428/36.92 |
| 5,011,890 A | 4/1991 | Novak | 525/154 |
| 5,258,233 A | 11/1993 | Mills et al. | 428/480 |
| 5,266,413 A | 11/1993 | Mills et al. | 428/480 |
| 5,340,884 A | 8/1994 | Mills et al. | 125/420 |
| 5,459,224 A | 10/1995 | Pruett et al. | 528/192 |
| 5,648,032 A | 7/1997 | Nelson et al. | 264/101 |
| 5,650,469 A | 7/1997 | Long et al. | 525/425 |
| 5,681,879 A | 10/1997 | Yamamoto et al. | 524/373 |
| 5,856,385 A | 1/1999 | Mehrer et al. | 524/108 |
| 6,191,209 B1 * | 2/2001 | Andrews | 524/502 |

FOREIGN PATENT DOCUMENTS

| | | | |
|---|---|---|---|
| EP | 0826713 | | 3/1998 |
| FR | 2 372 199 | * | 7/1978 |
| JP | 62-257959 | * | 11/1987 |
| WO | 93/20147 | | 10/1993 |
| WO | 93/23474 | | 11/1993 |
| WO | 98/07786 | | 2/1998 |
| WO | 98/39388 | | 9/1998 |
| WO | 00/66659 | | 11/2000 |
| WO | 01/00724 | | 1/2001 |
| WO | 01/02489 | | 1/2001 |
| WO | 01/23475 | | 4/2001 |

* cited by examiner

Primary Examiner—Patricia A. Short
(74) Attorney, Agent, or Firm—Tyler A. Stevenson

(57) ABSTRACT

A mixture of a polyester, such as poly(ethylene terephthalate) PET, and an additive combination, when extrusion compounded exhibits a lower residual acetaldehyde content than does PET alone when similarly treated. The additive combination comprises compounds selected from at least two groups wherein the groups are (i.) poly (vinyl alcohol) or ethylene/vinyl alcohol copolymer, (ii.) polyhydric alcohols and (iii.) polyacrylamide, polymethacrylamide or copolymer of acrylamide or methacrylamide. The invention pertains to any polyester used in the manufacture of bottles or containers which in turn are used to store consumer materials, especially food, beverages and most especially water.

20 Claims, No Drawings

POLYESTER COMPOSITIONS OF LOW RESIDUAL ALDEHYDE CONTENT

This application claims the benefit under 35 USC 119(e) of U.S. Provisional Application Ser. Nos. 60/259,140, filed Dec. 29, 2000 and 60/287,925, filed Apr. 30, 2001.

A mixture of a polyester, such as poly(ethylene terephthalate) PET, and an additive combination, when extrusion compounded exhibits a lower residual acetaldehyde content than does PET alone when similarly treated. The additive combination comprises compounds selected from at least two groups wherein the groups are (i.) poly(vinyl alcohol) or ethylene/vinyl alcohol copolymer, (ii.) polyhydric alcohols and (iii.) polyacrylamide, polymethacrylamide or copolymer of acrylamide or methacrylamide. The invention pertains to any polyester used in the manufacture of bottles or containers which in turn are used to store consumer materials, especially food, beverages and most especially water.

BACKGROUND OF THE INVENTION

U.S. Pat. No. 4,361,681 teaches that polyester containing anhydride end-cap agents have a reduced acetaldehyde generation rate.

U.S. Pat. No. 5,459,224 discloses polyesters having 4-oxybenzylidene end-cap agents to impart improved weatherability and photostability, but no mention is made as to evolution of acetaldehyde. However, it is indicated that such polyesters are suitable for food and beverage packaging.

Polyesters can be synthesized by a number of routes known in the art using a variety of catalyst systems. EP 826,713 A1 teaches that lower levels of acetaldehyde occur during copolymerization of PET when a phosphite such as bis(2,4-di-tert-butylphenyl)pentaerythritol phosphite is present during the polymerization.

U.S. Pat. Nos. 4,837,115; 5,258,233; 5,266,413; 5,340,884; 5,648,032 and 5,650,469; and WO 93/20147 A1; WO 93/23474 A1; WO 98/07786 and WO 98/39388 teach the use of polyamides as a means of reducing the concentration of acetaldehyde, presumably via a Schiff-base reaction with the aldehyde, which is reversible in the presence of water.

U.S. Pat. No. 5,856,385 teaches the use of polyamide or amide-wax to reduce the level of acetaldehyde which occurs when sorbitol-based clarifying agent is heated in polyolefins.

U.S. Pat. No. 5,011,890 describes the suppression of acetaldehyde formation when polyacrylamide, polymethacrylamide or selected acrylamide or methacrylamide copolymers are used in polyacetals. A requirement is that the polyacrylamide or polymethacrylamide must be "non-meltable" at the processing temperature of polyacetal. There is no suggestion in this patent that using polyacrylamide or polymethacrylamide in a polyester would reduce the concentration of acetaldehyde in a melt-mixed blend such as via extrusion.

Copending application Ser. Nos. 09/603,505 and 09/603,506 disclose the use of poly(vinyl alcohol) or an ethylene/vinyl alcohol copolymer and polyhydric alcohols, respectively, towards reducing the residual aldehyde content in PET. Copending application Ser. No. 09/666,679 discloses the use of polyacrylamide, polymethacrylamide or an acrylamide or methacrylamide copolymer with at least one ethylenically unsubstituted comonomer towards reducing the residual aldehyde content in PET.

U.S. Pat. No. 4,394,470 discloses a polyethylene terephthalate molding composition with a caramel colorant. The caramel colorant may have been formed in situ from a mono- or disaccharide.

U.S. Pat. No. 5,681,879 discloses a flame-retardant polyester composition comprising a polyester resin, a polyhydric alcohol having not less than 3 hydroxyl groups, an inorganic flame retardant and a halogen-based flame retardant.

WO 00/66659 discloses molding compositions comprising PET and polyhydric alcohol additives for the reduction of acetaldehyde formation.

WO 01/00724 discloses the use of polyols towards reducing acetaldehyde formation in extruded products of PET.

The invention is useful for any polyester where aldehydic compounds, especially acetaldehyde, are formed or evolved during thermal processing of said polyester. Thermal processing of PET includes the synthesis of PET, thermal exposure during solid state polymerization (SSP), any injection molding, injection-blow molding or stretch-blow molding used in the manufacture of preforms, parissons or bottles and containers, or extrusion of film, or during any melt processing of PET above its glass transition temperature and below its decomposition temperature.

The instant invention provides for a lower amount of contaminants (e.g. aldehydes) in PET water bottles thus providing for improved taste or flavor in bottled water or other bottled beverages in said PET containers. The reduction in the amount of acetaldehyde is highly beneficial in this respect. Acetaldehyde is known as a decomposition product of polyesters such as PET. The acetaldehyde imparts an undesirable taste or flavor to bottled water stored in PET bottles. It has been a long sought objective of the industry to reduce the level of acetaldehyde which migrates out of the PET bottle walls into the water or other beverage stored therein. A number of engineering or design changes to extruders, injection molding machines for preforms and bottle making machinery have been made to minimize formation of acetaldehyde when poly(ethylene terephthalate) PET is processed. Modification to the PET composition itself have been made to lower its melting point or its melt viscosity in order to allow less severe thermal or mechanical damage when PET is processed into preforms or bottles.

The particular additive combination of the present invention provide unexpected benefits in polyester compositions. Certain additive combinations are synergistic towards prevention of aldehyde formation during melt processing. Certain other additive combinations unexpectedly provide an optimal balance of low color, low haze and high aldehyde inhibition. "Haze" is an undesirable, perceptible graying effect.

DETAILED DISCLOSURE

The instant invention pertains to a polyester composition, stabilized against the formation of aldehydic contaminants during melt processing of said composition, which comprises
(a) a polyester, and
(b) an effective stabilizing amount of an additive combination, wherein the additives are selected from at least two different groups, wherein the groups are
(i.) poly(vinyl alcohol) or ethylene/vinyl alcohol copolymer,
(ii.) polyhydric alcohols and
(iii.) polyacrylamide, polymethacrylamide or an acrylamide or methacrylamide copolymer with at least one ethylenically unsubstituted comonomer.

The polyester of component (a) is 95–99.9% by weight of the stabilized composition; and the additive combination of component (b) is 5 to 0.1% by weight of the stabilized composition. Each additive selected from the groups (i.), (ii.) and (iii.) may be from 1 to 99% by weight of the total additive combination of component (b).

The present additive combinations of component (b) may be binary combinations, for example, a compound from group (i.) and a compound from group (ii.), or a compound from group (ii.) and a compound from (iii.). The additive combinations may, for example, also be ternary combinations, e.g., a compound from each of the groups (i.), (ii.) and (iii.).

The polyester of component (a) has dicarboxylic acid repeat units selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

Preferably such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid and mixtures thereof.

Especially preferred are terephthalic acid, isophthalic acid and 2,6-naphthalene dicarboxylic acid.

The diol or glycol portion of the polyester of component (a) are derived from the generic formula HO—R—OH where R is an aliphatic, cycloaliphatic or aromatic moiety of 2 to 18 carbon atoms.

Preferably such diols or glycols are ethylene glycol, diethylene glycol, triethylene glycol, propane-1,3-diol, propane-1,2-diol, butane-1,4-diol, pentane-1,5-diol, hexane-1,6-diol, 1,4-cyclohexanedime, 3-methylpentane-2,4-diol, 2-methylpentane1,4-diol, 2,2-diethyl-propane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane and mixtures thereof.

Most preferably, the diol is ethylene glycol and 1,4-cyclohexanedimethanol.

The polyester of component (a) is preferably poly(ethylene terephthalate) PET or poly(ethylene 2,6-naphthalene-2,6-dicarboxylate); most preferably poly(ethylene terephthalate).

It is also contemplated that the polyester of component (a) can also be a blend of polyesters or copolyesters including components mentioned above.

It is contemplated that the polyester of component (a) can be virgin polymer or alternatively polymer recyclate. Additionally, it is possible to combine 80–99% by weight of a polyester with 20–1% by weight of a concentrate where the concentrate comprises 10–90% by weight of a polyester carrier resin and 90–10% by weight of the additive combination described for component (b).

The novel polyester compositions provided by this invention are useful in the manufacture of containers or packages for comestibles such as beverages and food. Articles molded from these polyesters exhibit good thin-wall rigidity, excellent clarity and good barrier properties with respect to moisture and atmospheric gases, particularly carbon dioxide and oxygen.

The plastic containers and films of the present invention are rigid or flexible mono- and/or multi-layered constructions. Typical multi-layer constructions have two or more layer laminates, manufactured either by thermoforming, or extrusion of multi-layer flexible films, or extrusion of bottle "preforms" or "parissons" followed by subsequent blow molding of the preforms into bottles. In a multi-layer system, layers of any suitable plastic may be employed.

Multi-layered containers and films of this invention may, for example, be formed from layers of polyesters, polyolefins, polyolefin copolymers such as ethylene-vinyl acetate, polystyrene, poly(vinyl chloride), poly(vinylidene chloride), polyamides, cellulosics, polycarbonates, ethylene-vinyl alcohol, poly(vinyl alcohol), styrene-acrylonitrile and ionomers, with the proviso that at least one layer comprises a polyester composition of the present invention.

For both films and rigid packaging (bottles), typically the exterior layer, and innermost layer contacting the contents, are composed of polyesters such as PET or PEN [poly(ethylene naphthalate)], polypropylene, or polyethylene such as HDPE. The middle layers, often called 'barrier' or 'adhesive' or 'tie' layers, are composed of one or more combinations of either PET, PEN, carboxylated polyethylene ionomer such as Surlyn®, vinyl alcohol homopolymers or copolymers such as poly(vinyl alcohol), partially hydrolyzed poly(vinyl acetate), poly(ethylene-co-vinyl alcohol) such as EVOH or EVAL, nylons or polyamides such as Selar® (DuPont) or polyamides based on metaxylenediamine (sometimes called nylon MXD-6), or polyvinylidene chloride (PVDC), or polyurethanes.

Accordingly, the present invention also pertains to a mono- or multi-layered plastic container or film, stabilized against the formation of aldehydic contaminants during melt processing of said container or film, comprising at least one layer which comprises (a) a polyester, and
(b) an effective stabilizing amount of an additive combination, wherein the additives are selected from at least two different groups, wherein the groups are
   (i.) poly(vinyl alcohol) or ethylene/vinyl alcohol copolymer,
   (ii.) polyhydric alcohols and
   (iii.) polyacrylamide, polymethacrylamide or an acrylamide or methacrylamide copolymer with at least one ethylenically unsubstituted comonomer.

Rigid containers may be manufactured by known mechanical processes:
a) Single-stage blow molding such as performed on Nissei, Aoki, or Uniloy machines,
b) Two-stage, injection molding of pre-forms such as on Netstal or Husky machines, and pre-forms converted to bottles by blow molding (e.g., on Sidel, Corpoplast and Krones machines),
c) Integrated blow molding of pre-forms to bottles, such as processes conducted on Sipa, Krupp Kautex, or Husky ISB machines, and
d) Stretch blow molding (SBM) of pre-forms to bottles.

The pre-forms may be mono-layer or multi-layer in construction. The bottles may optionally be post-treated to alter the inner wall properties. Bottles may optionally be surface treated on the exterior such as by application of surface coatings. UV absorbers and other known stabilizers may be present in such added surface coatings.

By the use of known heat-setting techniques, certain of the polyesters are, in terms of color, I.V. and heat distortion, stable at temperatures up to about 100° C. Such stability characteristics are referred to herein as "hot-fill" stability. The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat and oriented by methods well known in the art to give a desired degree of crystallinity.

The additives of groups (i.), (ii.) and (iii.) are disclosed in copending application Ser. Nos. 09/603,505, 09/603,506 and 09/666,679, the relevant parts of which are each hereby incorporated by reference.

The additive of group (i.) is poly(vinyl alcohol) or an ethylene/vinyl alcohol copolymer.

Preferably, the additive of group (i.) is an ethylene/vinyl alcohol copolymer where the mole ratio of ethylene to vinyl alcohol is 99:1 to 1:99. Especially preferred, is the ethylene/vinyl alcohol copolymer where the mole ratio of ethylene to vinyl alcohol is 50:50 to 20:80.

The ethylene/vinyl alcohol copolymers of group (i.) can be random or block copolymers.

The compounds of group (ii.) are polyhydric alcohols of the formula

where n is 2 to 4000, and

E is a hydrocarbyl moiety.

A hydrocarbyl moiety according to this invention is for example an aliphatic, cycloaliphatic, aromatic or a mono-, di- or poly-saccharide moiety.

The hydrocarbyl moieties for the definition of E may be interrupted by heteroatoms, for example by —O—.

Polyhydric alcohols of group (ii.) may be for example glycerin, 1,2,3-butanetriol, 1,2,4-butanetriol, erythritol, ribitol, xylitol, dulcitol, sorbitol, 1,2,3-cyclohexatriol, inositol, glucose, galactose, mannose, galacturonic acid, xylose, glucosamine, galactosamine, 1,1,2,2-tetramethyloylcyclohexane, 1,1,1-trimethylolpropane, 1,1,2-trimethyloylpropane, 1,1,1-trimethylolbutane, 1,1,2-trimethylolbutane, 1,1,1-trimethylolpentane, 1,1,2-trimethylolpentane, 1,2,2-trimethylolpentane, trimethylolpentane, pentaerythritol, dipentaerythritol, 1,1,3,3-tetrahydroxypropane, 1,1,5,5-tetrahydroxypentane, 2,2,6,6-tetrakis(hydroxymethyl)cyclohexane and 2,2,6,6-tetrakis(hydroxymethyl)cyclohexanol.

The polyhydric alcohol is for instance starch, cellulose or a sugar or a sugar alcohol.

The polyhydric alcohols include degraded starch (dextrins and cyclodextrins), maltose and its derivatives, maltitol, maltopentaose hydrate, maltoheptaose, maltotetraose, maltulose monohydrate, D,L-glucose, dextrose, sucrose and D-mannitol.

Commercial polyhydric alcohols include trimethylol propane, triethylol propane, glycerol, sorbitol and pentaerythritol.

The polymer of group (iii.) is any polymer which contains a polymerized acrylamide or methacrylamide repeating unit. The preparation of acrylamide or methacrylamide polymers is generally known.

Preferably, the polymer of group (iii.) is polyacrylamide, or a copolymer of acrylamide with another ethylenically unsaturated monomer such as methacrylamide, styrene, ethylene, an alkyl acrylate, an alkyl methacrylate, N-vinyl-2-pyrrolidinone or acrylonitrile.

Other preferred comonomers for group (iii.) are the hydroxyalkyl methacrylates, the hydroxyalkyl acrylates or dimethylaminoethyl methacrylate. In these cases, the resulting copolymers contain both aldehyde reactive amine groups as aldehyde reactive hydroxyl moieties.

Most preferably, the polymer of group (iii.) is polyacrylamide (PERCOL® 333, Ciba) or polyacrylamide (PERCOL® 351, Ciba).

The copolymers of group (iii.) can be random or block copolymers.

It is also contemplated that the compositions may contain other components or modifiers such as stabilizers, dispersants, pigments, colorants, UV absorbers, antioxidants, toughening agents, nucleating agents and fillers as described in U.S. Pat. No. 5,011,890, the pertinent parts of which are incorporated herein by reference.

The instant invention also pertains to a process for preventing the formation of aldehydic contaminants during melt processing of a polyester which comprises incorporating into said polyester an effective stabilizing amount of an additive combination, wherein the additives are selected from at least two different groups, wherein the groups are (i.) poly(vinyl alcohol) or ethylene/vinyl alcohol copolymer, (ii.) polyhydric alcohols and (iii.) polyacrylamide, polymethacrylamide or an acrylamide or methacrylamide copolymer with at least one ethylenically unsubstituted comonomer.

The instant invention also pertains to a process for forming a bottle preform or a PET bottle or container suitable for storing water (mineral, natural, ozonated) or other foodstuffs, which allows the desirable taste of the water or foodstuff after packaging to remain unaltered after being placed in said bottle or container prepared from the polyester composition of the instant invention.

The instant plastic container or film stabilized by a compound or compounds of component (b) may also optionally have incorporated therein or applied thereto from about 0.01 to about 10% by weight; preferably from about 0.025 to about 5% by weight, and most preferably from about 0.1 to about 3% by weight, based on the total weight of the composition, of additional coadditives such as antioxidants, other UV absorbers, hindered amines, phosphites or phosphonites, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like, such as the materials listed below, or mixtures thereof.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tertbutylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl) dicyclopentadiene, bis[2-(3'tert-butyl-2-hydroxy-5-methylbenzyl)-6-tetra-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-1,1,5,5-tetra-(5-tert-butyl-4-hydroxy-2-methylphenyl)pentane.

1.7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl) sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroroxybenzyl)isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylpropionyl)-hexahydro-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl) isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane.

1.17. Amides of β-(3,5-di-tert-butyl-4-hydroxyphenyl) propionic acid e.g. N,N'-bis(3,5-di-tert-butyl-4-hydroxyphenylproplonyl)hexamethylenediamide, N,N'-bis (3,5-di-tert-butyl-4-hydroxyphenylpropionyl)

trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyidiphenylamines, a mixture of mono- and dialkylated isopropyl/isohexyidiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV absorbers and light stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987 and 5,977,219, such as 2-(2-hydroxy-5-methylphenyl)-2H-benzotriazol, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazol, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, -2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole, and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidenemalonate (CAS #147783-69-5).

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracaboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4,5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-trizine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in GB-A-2301106 as component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on pages 68 to 73 of said GB-A-2301106.

The sterically hindered amine may also be one of the compounds described in EP 782994, for example compounds as described in claims 10 or 38 or in Examples 1–12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl) glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine.

2.8. Oxamides, for example 4,4'-dioctyloxyoxanilide, 2,2'-diethoxyoxanilide, 2,2'-dioctyloxy-5,5'-di-tert-butoxanilide, -2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.9. Tris-aryl-o-hydroxyphenyl-s-triazines, for example known commercial tris-aryl-o-hydroxyphenyl-s-triazines and triazines as disclosed in, WO 96/28431, EP 434608, EP 941989, GB 2,317,893, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(2,4-dimetylpenyl)-s-trizine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxyl-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylpheny]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)-phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy4-hexyloxy-5-α-cumylphenyl)-s-triazine, 2-(2,4,6-trimethylphenyl)-4,6-bis[2-hydroxy-4-(3-butyloxy-2- hydroxypropyloxy)phenyl]-ss-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine, and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butane, 6-fluoro-2,4,8,10-tetra-tert-butyl-12-methyl-dibenzo[d,g][1,3,2]dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-dlyl)phosphite], 2-ethylhexyl(3,3',5,5'-tetra-tert-butyl-1,1'-biphenyl-2,2'-diyl)phosphite.

Especially preferred are the following phosphites:
Tris(2,4-di-tert-butylphenyl) phosphite (Irgafos® 168, Ciba Specialty Chemicals Corp.), tris(nonylphenyl) phosphite,

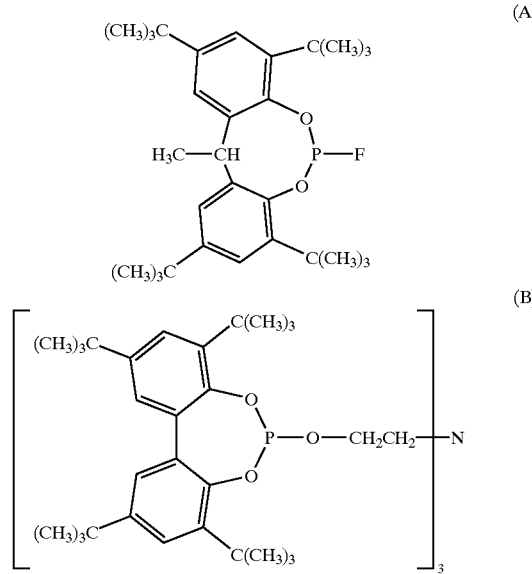

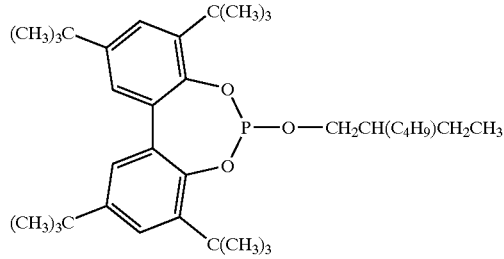

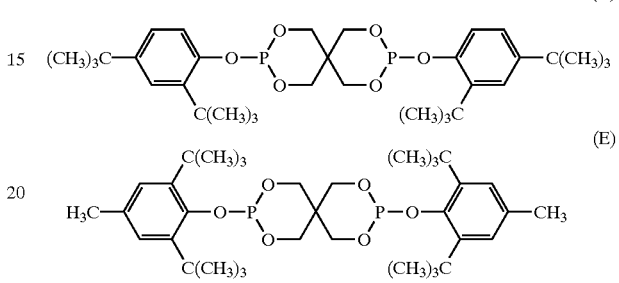

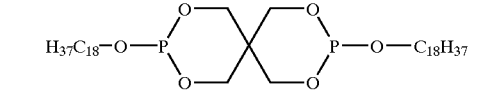

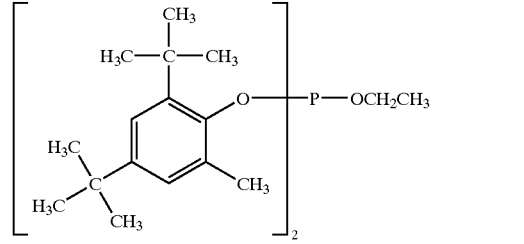

5. Benzofuranones and indolinones, for example those disclosed in U.S. Pat. Nos. 4,325,863, 4,338,244, 5,175,312, 5,216,052, 5,252,643; DE-A-4316611; DE-A-4316622; DE-A4316876; EP-A-0589839 or EP-A-0591102 or 3-[4-(2-acetoxyethoxy)-phenyl]-5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-t-3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, Irganox® HP-136, Ciba Specialty Chemicals Corp., and 3-(2,3-dimethylphenyl)-5,7-di-tert-butyl-benzofuran-2-one.

6. Thiosynergists, for example dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Polyamide stabilizers, for example copper salts in combination with iodides and/or phosphorus compounds and salts of divalent manganese.

9. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Dispersing Agents, such as polyethylene oxide waxes or mineral oil.

13. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers such as substituted and unsubstituted bisbenzylidene sorbitols, benzoxazinone UV absorbers such as 2,2'-p-phenylene-bis(3,1-benzoxazin-4-one), Cyasorb® 3638 (CAS# 18600-59-4), and blowing agents.

The following examples are for illustrative purposes only and are not to be construed to limit the scope of the instant invention in any manner whatsoever.

General—PET bottle grade pellets are subjected to extrusion compounding to simulate the heat history which PET experiences when thermally injection molded into bottle preforms and subsequently stretch-blow molded into bottles. The efficacy of an additive added to reduce the formation of acetaldehyde is determined by quantitative analysis using thermal desorption GC-MS after adoption of published methods. An unstabilized PET is extruded each day to provide a control polymer for measuring acetaldehyde formation.

Extrusion—PET is pre-dried in vacuo under nitrogen at an oven temperature of about 70° C. to a moisture level of about 30 ppm which is verified on a Mitsubishi VA-O6 moisturemeter. A Leistritz 18 mm or 27 mm corotating, non-intermeshing twin screw extruder is configured as follows: set temps=throat (220–230° C.), zones and die (270° C.), actual extrudate melt temperature is 275–280° C., screw at 100–110 rpm, hopper feeder=10–15 ppm.

PET Pellet Color—Yellowness Index (YI), and L*, a*, b* by ASTM D1925, D65 10 degm specular included, measured on PET pellets using a DCI spectrophotometer.

Acetaldehyde Analysis—The concentration of acetaldehyde in PET is quantitatively determined using a thermal desorption GC-MS method adapted from B. Nijassen et al., Packaging Technology and Science, 9, 175 (1996); S. Yong Lee, SPE ANTEC 1997, pp 857–861; and M. Dong et al., J. Chromatographic Science, 18, 242 (1980). A general example follows below:

The PET samples are analyzed, in duplicate, by weighing 250 mg of powdered PET pellets (cryogenically pulverized) in a 5 mL crimp sealed headspace vial. The sample vial is heated at 120° C. for one hour in a Tekmar model 5000 static headspace analyzer. The headspace gas (5 cc) is then transferred via a heated transfer line to a Fisons MD-800 GC-MS system for SIR detection of the acetaldehyde. The acetaldehyde is detected by monitoring its fragment ions of 29 and 44 m/e. The Total Ion Current (TIC) of the GC-MS is also monitored in the retention time region of 4–8 minutes. By doing this the presence of acetaldehyde in the samples is confirmed by three different detectors. By using a known acetaldehyde value for PET, the ratio of peak areas for the known PET resin and for the experimental PET resin blends are compared and the amount of acetaldehyde in the experimental blend can be obtained.

Haze—PET blends are injection molded into 2"×2"×60 mil plaques using a BOY 50M Injection Molder at a die temperature of 550° F. (288° C.). A BYK-Gardner Haze meter is used to measure haze. "Haze" is an undesirable, perceptible graying effect.

EXAMPLE 1

Unstabilized commercial PET (CLEARTUF® 7207, Shell) is used as a control PET. Several additive combinations listed below demonstrate a significant reduction in the amount of acetaldehyde (AA) versus the amount seen when unstabilized PET is extrusion compounded. The % AA reduction is the amount less compared to the amount of AA in the control. The total ion current (TIC) data run in triplicate for the control PET has a standard deviation of s=0.35. Parts per million (ppm) additive is based on resin.

| Formulation | Additives |
| --- | --- |
| A (control) | none |
| B | 2500 ppm polyacrylamide, Percol ® 333 (Ciba) |
| | 400 ppm poly(vinyl alcohol), PVA |
| C | 2500 ppm polyacrylamide, Percol ® 333 (Ciba) |
| | 1600 ppm cellulose |
| D | 400 ppm poly(vinyl alcohol), PVA |
| | 1600 ppm cellulose |
| E | 2500 ppm polyacrylamide, Percol ® 351 (Ciba) |
| | 400 ppm poly(vinyl alcohol), PVA |
| F | 2500 ppm polyacrylamide, Percol ® 333 (Ciba) |
| | 400 ppm poly(vinyl alcohol), PVA |
| | 1600 ppm cellulose |
| G | 750 ppm ethylene/vinyl alcohol copolymer, 40% ethylene |
| | 2000 ppm starch |
| H | 750 ppm ethylene/vinyl alcohol copolymer, 40% ethylene |
| | 1000 ppm starch |
| | 1000 ppm cellulose |

The use of the present additive combinations results in the reduction of acetaldehyde versus the control and provides for excellent color control and low haze formation.

When polyacrylamide, Percol® 333 or Percol® 351 are interchanged in the above formulations, excellent results for aldehyde inhibition, low color and low haze are seen. When starch and cellulose are interchanged in the above formulations, excellent results for aldehyde inhibition, low color and low haze are seen. When poly(vinyl alcohol), PVA, ethylene/vinyl alcohol copolymer, 40%, 38%, 32% or 27% ethylene, are interchanged in the above formulations, excellent results for aldehyde inhibition, low color and low haze are seen.

What is claimed is:
1. A polyester composition, stabilized against the formation of aldehydic contaminants during melt processing of said polyester, which comprises
   (a) a polyester, and
   (b) an effective stabilizing amount of an additive combination, wherein the additives are selected from two different groups, wherein the groups are
      (ii.) polyhydric alcohols which are selected from the group consisting of starch, cellulose, a sugar or sugar alcohol, trimethylol propane, triethylol propane, glycerol, sorbitol, pentaerythntol or dipentaerythritol, degraded starch (dextrins or cyclodextrins), maltose or its derivatives, maltitol, maltopentaose hydrate, maltoheptaose, maltotetraose, maltulose monohydrate, D,L-glucose, dextrose, sucrose, and D-mannitol, and (iii.) polyactylamide, polymethacrylamide or an acrylamide or methacrylamide copolymer with at least one ethylenically unsubstituted comonomer.

2. A composition according to claim 1 wherein the polyester of component (a) is 95–99.9% by weight of the stabilized composition; and the additive combination of component (b) is 5 to 0.1% by weight of the stabilized composition.

3. A composition according to claim 1 wherein the polyester of component (a) has dicarboxylic acid repeat units selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

4. A composition according to claim 3 wherein the dicarboxylic acid is terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, glutaric acid, adipic acid, sebacic acid and mixtures thereof.

5. A composition according to claim 4 wherein the dicarboxylic acid is terephthalic acid or 2,6-naphthalene dicarboxylic acid.

6. A composition according to claim 1 wherein the diol portion of the polyester of component (a) is derived from the generic formula HO—R—OH where R is an aliphatic, cycloaliphatic or aromatic moiety of 2 to 18 carbon atoms.

7. A composition according to claim 6 wherein the diol is ethylene glycol, diethylene glycol, triethylene glycol, propane-1,3-diol, butane-1,4-diol, pentane-1,5-diol, hexane-1,6-diol, 1,4-cyclohexanedimethanol, 3-methylpentane-2,4-diol, 2-methylpentane1,4-diol, 2,2-dimethylpropane-1 3-diol, 1,4-di-(hydroxyethoxy)benzene, 2,2-bis(4-hydroxycyclohexyl)-propane, 2,4-dihydroxy-1,1,3,3-tetramethylcyciobutane, 2,2-bis-(3-hydroxyethoxyphenyl) propane, 2,2-bis-(4-hydroxypropoxyphenyl)-ethane and mixtures thereof.

8. A composition according to claim 7 wherein the diol is ethylene glycol.

9. A composition according to claim 1 wherein the polyester of component (a) is poly(ethylene terephthalate) PET or poly(ethylene 2,6-naphthalene-2,6-dicarboxylate).

10. A composition according to claim 9 wherein the polyester is poly(ethylene terephthalate).

11. A composition according to claim 1 wherein the polyhydric alcohol of group (ii.) is starch, cellulose or a sugar or a sugar alcohol.

12. A composition according to claim 11 wherein the polyhydric alcohol is cellulose or starch.

13. A composition according to claim 1 wherein the polyhydric alcohol is selected from the group consisting of degraded starch (dextrins and cyclodextrins), maltose and its derivatives, maltitol, maltopentaose hydrate, maltoheptaose, maltotetraose, maltulose monohydrate, D,L-glucose, dextrose, sucrose and D-mannitol.

14. A composition according to claim 1 wherein the polyhydric alcohol is selected from the group consisting of trimethylol propane, triethylol propane, glycerol, sorbitol, pentaerythritol and dipentaerythritol.

15. A composition according to claim 1 wherein the additive of group (iii.) is polyacrylamide, polymethacrylamide or a copolymer of acrylamide or methacrylamide with another ethylenically unsaturated monomer which is acrylamide, methacrylamide, styrene, ethylene, an alkyl acrylate, an alkyl methacrylate, N-vinyl-2-pyrrolidinone or acrylonitrile.

16. A composition according to claim 15 wherein the additive of group (iii.) is polyacrylamide.

17. A composition according to claim 1 wherein the additive of group (iii.) is a copolymer of acrylamide or methacrylamide with another ethylenically unsaturated monomer which is a hydroxyalkyl methacrylate, a hydroxyalkyl acrylate or dimethylaminoethyl methacrylate.

18. A process for preventing the formation of aldehydic contaminants during melt processing of a polyester which comprises incorporating into said polyester an effective stabilizing amount of an additive combination, wherein the additives are selected from two different groups, wherein the groups are (ii.) polyhydric alcohols which are selected from the group consisting of starch, cellulose, a sugar or sugar alcohol, trimethylol propane, triethylol propane, glycerol, sorbitol, pentaerythritol or dipentaerythritol, degraded starch (dextrins or cyclodextrins), maltose or its derivatives, maltitol, maltopentaose hydrate, maltoheptaose, maltotetraose, maltulose monohydrate, D,L-glucose, dextrose, sucrose, and D-mannitol, and (iii.) polyacrylamide, polymethacrylamide or an acrylamide or methacrylamide copolymer with at least one ethylenically unsubstituted comonomer.

19. A mono- or multi-layered plastic container or film, stabilized against the formation of aldehydic contaminants during melt processing of said container or film, comprising at least one layer which comprises (a) a polyester, and (b) an effective stabilizing amount of an additive combination, wherein the additives are selected from different groups, wherein the groups are (ii.) polyhydric alcohols which are selected from the group consisting of starch, cellulose, a sugar or sugar alcohol, trimethylol propane, triethylol propane, glycerol, sorbitol, pentaerythritol or dipentaerythritol, degraded starch (dextrins or cyclodextrins), maltose or its derivatives, maltitol, maltopentaose hydrate, maltoheptaose, maltotetraose, maltulose monohydrate, D,L-glucose, dextrose, sucrose, and D-mannitol, and (iii.) polyacrylamide, polymethacrylamide or an acrylamide or methacrylamide copolymer with at least one ethylenically unsubstituted comonomer.

20. A plastic container according to claim 19 which is a rigid bottle.

* * * * *